United States Patent
Maugars et al.

(10) Patent No.: US 6,636,072 B1
(45) Date of Patent: Oct. 21, 2003

(54) BIDIRECTIONAL INTERFACE

(75) Inventors: Philippe Maugars, Ranes (FR); Christophe Declercq, Colomby sur Thaon (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 668 days.

(21) Appl. No.: 09/624,640

(22) Filed: Jul. 25, 2000

(30) Foreign Application Priority Data

Jul. 27, 1999 (FR) .............................. 99 09733

(51) Int. Cl.⁷ .......................................... H03K 19/0175
(52) U.S. Cl. ............................. 326/82; 326/26; 326/86
(58) Field of Search .................. 375/220, 257, 375/295; 710/305, 316; 709/324; 307/85; 326/37–41, 82, 83, 86, 89, 26

(56) References Cited

U.S. PATENT DOCUMENTS

| 5,656,950 A | * | 8/1997 | Duong et al. | .................. 326/41 |
| 5,767,701 A | * | 6/1998 | Choy et al. | .................... 326/93 |
| 5,801,549 A | * | 9/1998 | Cao et al. | ...................... 326/83 |
| 5,923,187 A | * | 7/1999 | Maugars | ...................... 326/86 |

FOREIGN PATENT DOCUMENTS

EP 0785646 A1 7/1997 ............. H04L/5/18

* cited by examiner

*Primary Examiner*—Don Le
(74) *Attorney, Agent, or Firm*—Daniel J. Piotroski

(57) ABSTRACT

The invention relates to a data transmission device between two separate lines. This device comprises a real terminal (TRA, TRB) and a virtual terminal (TVA, TVB) associated with each of the lines. The state of a real terminal is that of the associated line. The state of a virtual terminal indicates whether the associated line is transmitting or able to receive a data. Each real terminal associated with a line controls the state of the virtual terminal associated with the other line by means of a control signal (COM), while said virtual terminal controls the state of its associated real terminal (CTRL), and accordingly of the line. A virtual terminal associated with a receiving line receives the control signal (COM) coming from the real terminal associated with the other line and inhibits (INH) the real terminal associated with this receiving line. The inhibited real terminal of the receiving line accordingly is no longer capable of sending a control signal (COM) as long as the other line is transmitting. According to the invention, two lines cannot transmit at the same time, while the switching of the transmission device is fast.

5 Claims, 3 Drawing Sheets

BIDIRECTIONAL INTERFACE

Figure 1:
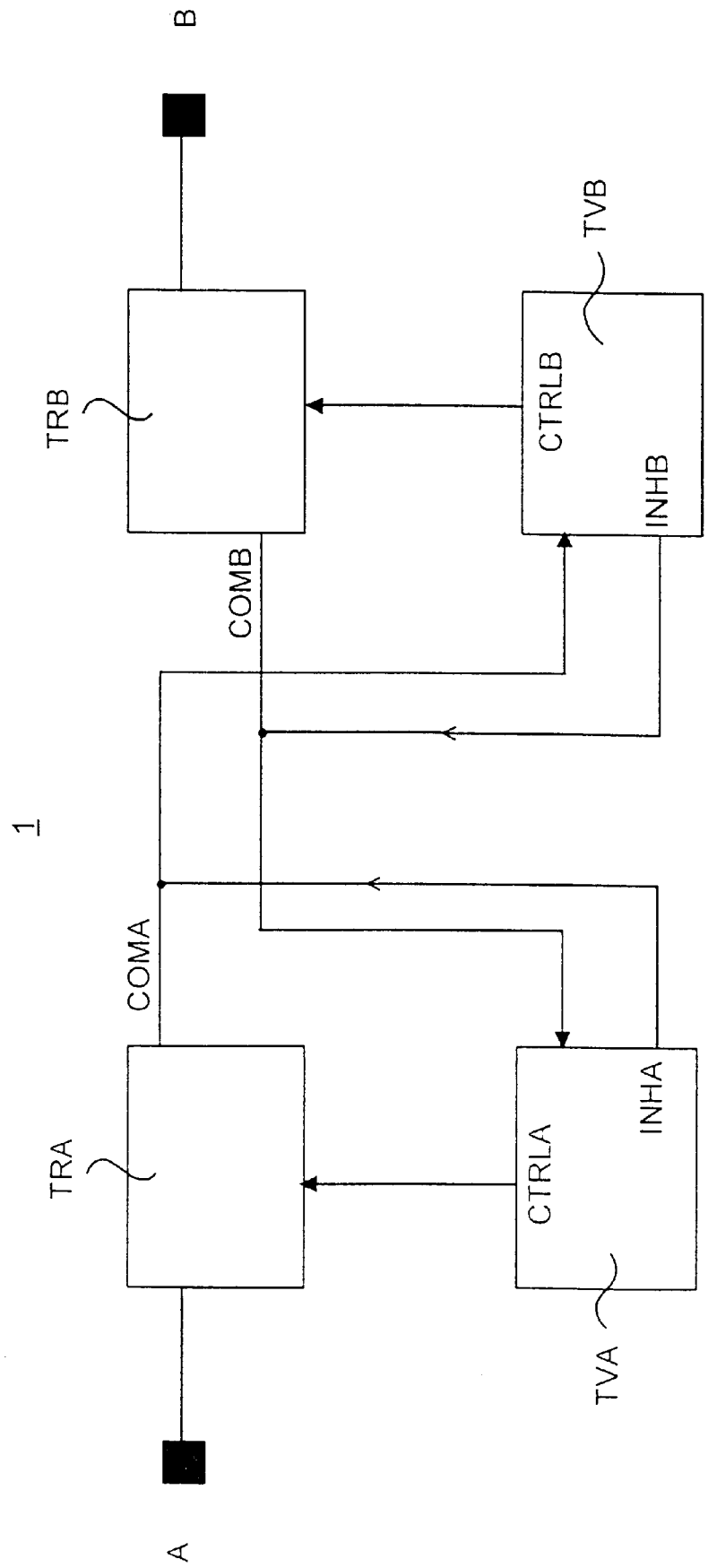

The invention relates to a data transmission device between two lines able to transmit digital data, whose logic levels correspond to an active state and an idle state of each line, by means of an interface module which provides the connection between said lines.

The invention also relates to a method of transmitting data between two lines. The device described is particularly advantageous for providing the data communication between two lines which have different reference potentials.

Such a device is described in European patent application EP 0 785 646. The device disclosed therein comprises an interface module which carries out a systematic adaptation of the logic level of the transmitted data to the characteristics of the receiving line by means of control devices and management devices which are associated with each line. The management device associated with a first line comprises means for blocking the management device associated with the second line. This blocking of the management device of the second line prevents the second line from acting as a transmitter as long as the management device associated therewith has not been unblocked by the management device of the first line. The transmitter device according to the prior art thus introduces a delay during which the line, which has just received a data, cannot in its turn send data in response.

The invention has for its object to counteract this disadvantage by proposing a data transmission device between two lines which authorizes one line, which has received a data from another line, to send back in its turn a data substantially immediately.

According to the invention, the interface module of a data transmission device as described in the opening paragraph comprises a real terminal and a virtual terminal associated with each of the lines, wherein each real terminal is provided with means for reproducing the state of the line with which it is associated and, conversely, controlling the state of the line, and is provided with control means for controlling the state of the virtual terminal associated with the other line, and each virtual terminal is provided with means for enabling it to enter an active state when the other line must transmit a data and to enter a passive state if this is not the case, with means for controlling the state of the associated real terminal, and with means for inhibiting the operation of the control means of the associated real terminal if and exclusively if the virtual terminal is in the active state.

The interface module of the proposed device enables to define at any given moment whether or not the associated line has a receiving character by means of the virtual terminals associated with each line. The virtual terminals enable to prevent the two lines from transmitting at the same time. The association of the virtual and real terminals associated with a first line controls the virtual terminal associated with the second line. Thus the management of the state of a virtual terminal associated with one line is carried out by the other line. A transmitting line can thus prevent the other line from transmitting data while it itself is transmitting. This blocking action is immediately interrupted the moment the transmitting line ceases to transmit data. The second line is then immediately capable of transmitting in its turn and responding. An advantage of the invention is a fast switching of the interface module which, unlike that of the device according to the prior art, does not introduce any delay between the transmission of consecutive data by each of the lines.

The invention also relates to a data transmission method between two lines able to transmit digital data, whose logic levels correspond to an active state and an idle state of said lines, by means of an interface module which provides the connection between the lines and which comprises a real terminal and a virtual terminal for each of the lines, which method comprises the following steps for the transmission of a data from a transmitting line to a receiving line:

reproduction by the real terminal associated with the transmitting line of the state of said line, making the virtual terminal associated with the receiving line enter the active state, controlling of the real terminal associated with the receiving line by the associated virtual terminal, transmission of the data over the receiving line by the real terminal associated with this line.

Figure 2:
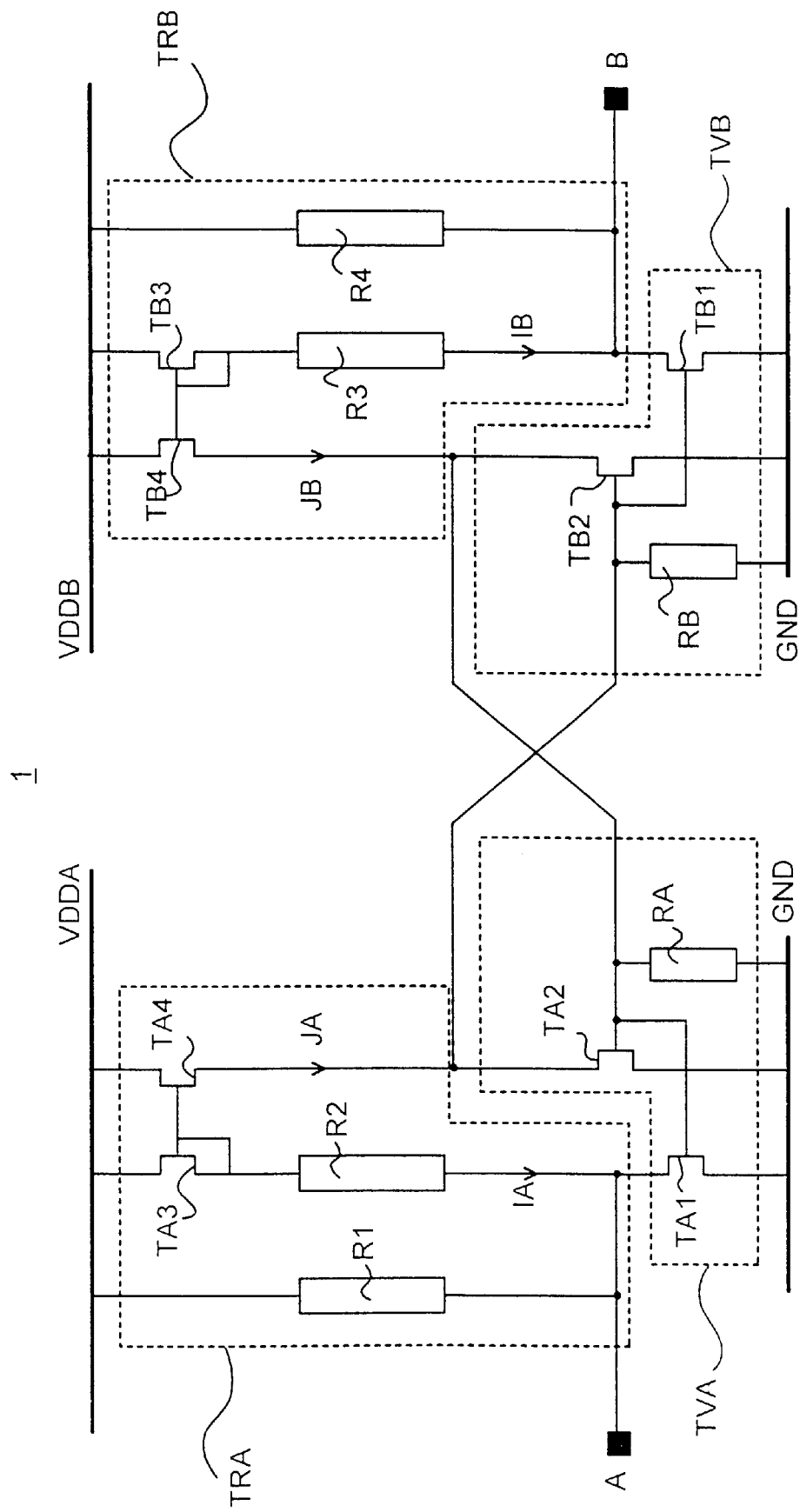
Figure 3:
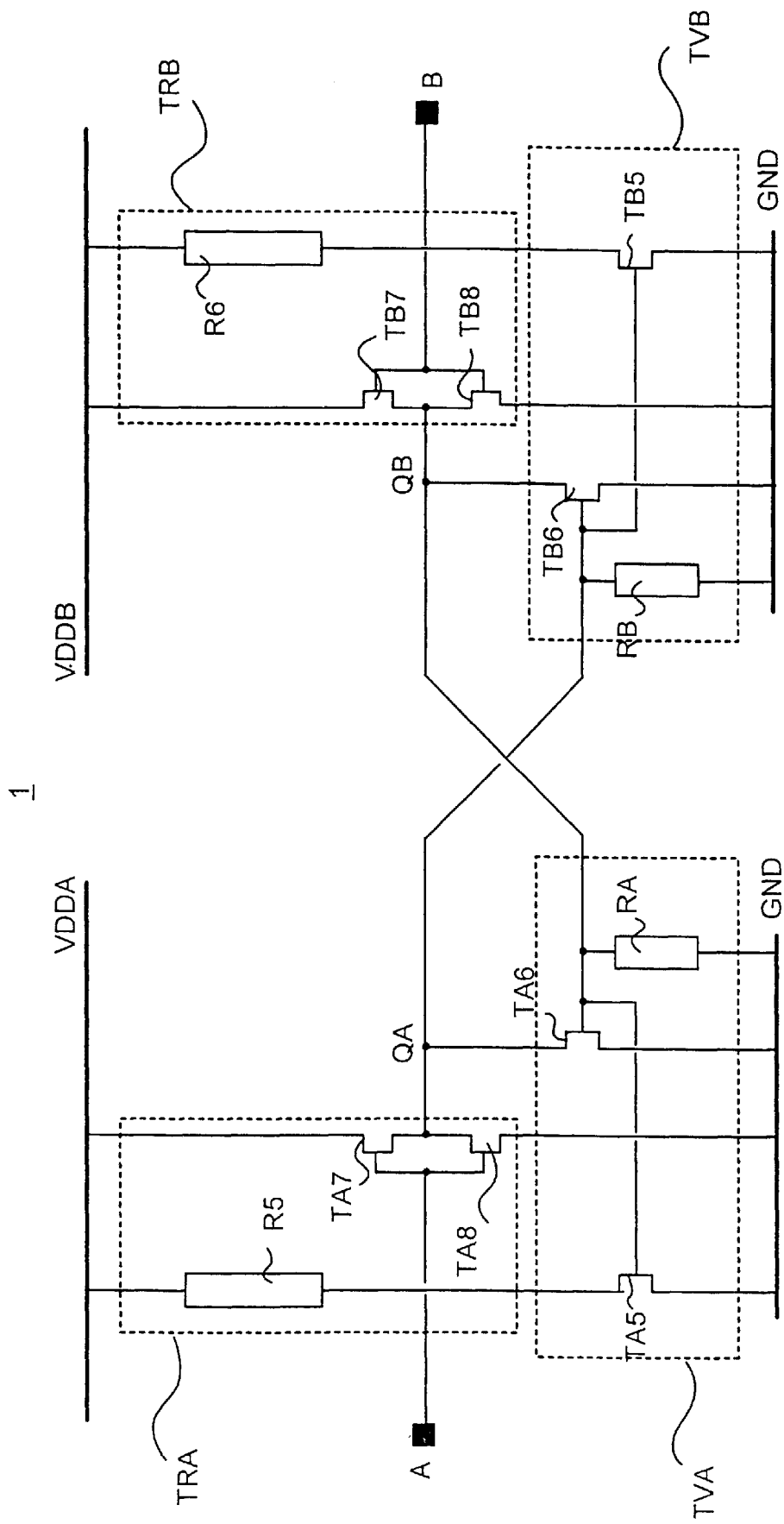

The invention will be better understood thanks to the following description of a few embodiments which is given by way of example only and with reference to the annexed drawings, in which:

FIG. 1 is a block diagram of the operation of a data transmission device according to the invention, FIG. 2 is a circuit diagram of an embodiment of a transmission device according to the invention, and FIG. 3 is a circuit diagram of an alternative embodiment of a transmission device according to the invention.

A block diagram of a data transmission device 1 according to the invention is shown in FIG. 1. This transmission device 1 provides the interface for the communication of data between two lines A and B. Each line may be in a first or active state, when a data is being transmitted over the line, or may be in a second or idle state, when the line does not transmit any data, which corresponds to a state in which the line can receive a data from the other line or transmit a data to the other line. The transmission device 1 comprises two real terminals TRA, TRB associated with the lines A and B, respectively, and two virtual terminals TVA, TVB, associated with the lines A and B, respectively.

Each real terminal TRA, TRB is provided with means for controlling the state of the respective line A, B and conversely for adopting the state of said line. In the diagram as shown in FIG. 1, the real terminals TRA and TRB are each connected to their respective line. A real terminal is accordingly in an active state when the line with which it is associated is in the active state, and is in a passive state when the relevant line is in the idle state. The reverse also holds: the line is put in the active state when the real terminal is put in the active state, and the line is put in the idle state when the real terminal is put in the passive state. Each real terminal TRA, TRB is also provided with control means for enabling this terminal to send a control signal COMA, COMB to the virtual terminal associated with the other line so as to control the state of this virtual terminal.

Each virtual terminal TVA, TVB associated with a line comprises means for receiving the control signal COMB, COMA which the real terminal associated with the other line is designed to transmit. Depending on the value of this signal, the virtual terminal under consideration enters an active state if the line with which it is associated is to receive a data, and a passive state if this is not the case. The state of a virtual terminal is thus a function of the control signal received from the real terminal associated with the other line. A virtual terminal is in addition provided with means CTRLA, CTRLB for controlling the state of its associated real terminal, and consequently the state of the associated line. Each virtual terminal TVA, TVB is also provided with inhibition means INHA, INHB for inhibiting the control means of the associated real terminal, and as a result preventing it from transmitting the control signal COM. In a particular embodiment of the invention, the inhibition means INH are activated solely in the case in which the virtual terminal is in the active state, i.e. when the associated line is to receive a data from the other line. In this embodiment of the invention, accordingly, a line cannot transmit when it is already receiving a data from the other line.

The operation of the various terminals of the embodiment of the invention shown in FIG. 1 will be explained below. The transmission of a data from line A, the transmission line, to line B, the receiving line, will now be considered. The line A, transmitting a data, is in the active state. The real terminal TRA which is associated with this line is accordingly also in the active state. To transmit the data, the control means of the real terminal TRA send the control signal COMA to the virtual terminal associated with the receiving line B. This control signal COMA is sent exclusively in the situation in which the operation of the control means is not inhibited by the inhibition means INHA of the associated virtual terminal TVA, i.e., as explained above, if the transmitting line A must not at this very moment receive a data from the other line B. The lines A and B thus cannot transmit simultaneously. This control signal COMA controls the state of the virtual terminal TVB associated with the other line and, in this embodiment of the invention, forces it into the active state. The control means CTRLB of the virtual terminal TVB associated with the line B put the real terminal TRB and the receiving line B in the active state, which ensures the transmission of the data. The control means of the real terminal TRB are then able to transmit the command signal COMB to the virtual terminal TVA. However, since the virtual terminal TVB is in the active state, its inhibition means INHB are activated and prevent the operation of these control means of the associated real terminal TRB. This prevents the receiving line B from sending a data to the line A as long as the line A is transmitting.

When the transmitting line A has finished transmitting, it is in the idle state again and accordingly the real terminal TRA associated with it enters the passive state. The real terminal TRA then no longer transmits the control signal COMA which kept the virtual terminal TVB in the active state. The virtual terminal TVB enters the passive state again, and consequently the real terminal TRB and the line B return to the idle state. The inhibition means INHB of the virtual terminal TVB are deactivated and no longer prevent the control means of the real terminal TRB from operating. The line B then in its turn can transmit a data in response immediately. The communication of a transmission device according to the invention is very fast, and a line can send a data to another line at any moment as long as the latter does not transmit data at that very moment.

A circuit diagram of an embodiment of a transmission device 1 according to the invention is shown in FIG. 2. The transmission device 1 provides the interface for the bidirectional communication of data between the distinct lines A and B. Each line is capable of transmitting digital data whose logic levels correspond to reference potentials of the relevant line. In this embodiment, a line transmitting a data is in the active state and is brought to a zero reference potential. Thus, when line A is transmitting a data, its potential is set for zero, and similarly the potential of line B is set for zero when this line is transmitting a data. When a line is not transmitting data, the line is in the idle state and is set for a positive reference potential VDD. Thus the lines A and B are in the idle state when these lines are set for their respective potentials VDDA and VDDB.

The transmission device 1 comprises real terminals TRA, TRB and virtual terminals TVA, TVB associated with the respective lines A and B, as shown in FIG. 2. In this embodiment of the invention, the real terminal TRA comprises a first resistor R1, a second resistor R2, a first transistor TA3, and a second transistor TA4. The first resistor R1 is connected between a reference potential terminal VDDA and the line A. The second resistor R2 is placed between the line A and the first transistor TA3. The first and second transistors TA3, TA4 are connected to the reference potential terminal VDDA and form a current mirror {TA3, TA4}. Similarly, the real terminal TRB comprises a third resistor R3, a fourth resistor R4, a third transistor TB3 and a fourth transistor TB4 connected symmetrically with respect to the elements of the real terminal TRA. The virtual terminal TVA comprises a fifth transistor TA1, a sixth transistor TA2, and a fifth resistor RA. The fifth transistor TA1 is connected between the line A and a reference potential terminal GND. The sixth transistor TA2 in its turn is connected between the reference potential terminal GND and the second transistor TA4 of the real terminal TRA. It is assumed for this embodiment and for the ensuing description that the transistors used are of the MOS type and that the gate of each transistor is denoted the control electrode hereinafter. Bipolar transistors, whose bases are the control electrodes, may be used instead. The control electrodes of the fifth transistor TA1 and the sixth transistor TA2 are connected to a terminal of the fifth resistor RA, of which another terminal is connected to the reference potential terminal GND. In the same way as for the virtual terminal TVA, the virtual terminal TVB comprises a seventh transistor TB1, an eighth transistor TB2, and a sixth resistor RB which are interconnected in a symmetrical manner with respect to the elements of the virtual terminal TVA.

The real terminal TRA is in an active state when the first transistor TA3 and the second transistor TA4 are conducting and are traversed by respective currents IA, JA. The real terminal TRA is in a passive state when the first and second transistors TA3, TA4 are blocked, and no current flows through them. The virtual terminal TVA is in an active state when the fifth transistor TA1 and the sixth transistor TA2 are conducting, and is in a passive state when said fifth and sixth transistors TA1 and TA2 are blocked. An similar description could be given for the real and virtual terminals associated with the line B.

It is assumed that initially neither of the lines transmits data. The lines A and B are in the idle state and are at their respective potentials VDDA and VDDB. The current IA flowing through the second resistor R2 is zero, and the current JA which the current mirror {TA3, TA4} is capable of generating in the second transistor TA4 is accordingly also zero. Similarly, the currents IB and JB are zero. The fifth resistor RA, which connects the control electrodes of the fifth and sixth transistors TA1 and TA2 to the reference potential terminal GND, keeps these fifth and sixth transistors TA1 and TA2 blocked. The seventh and eighth transistors TB1, TB2 are blocked in a symmetrical manner. The real terminals TRA, TRB and the virtual terminals TVA, TVB are thus in the passive state initially.

When the line A transmits a data to the line B, the potential of the transmitting line A is set for zero, and said line passes from the initial passive state to the active state. The first transistor TA3 becomes conducting, and a current IA not equal to zero traverses the second resistor R2. The current mirror {TA3, TA4} generates a current JA not equal to zero in the second transistor TA4 as a function of IA. This current JA is the control signal COMA, which is transmitted by the real terminal TRA to the virtual terminal TVB associated with the line B. The control means of the real terminal A in this embodiment are thus formed by the current mirror {TA3, TA4}. Furthermore, the inhibition means INHA of the virtual terminal TVA are formed by the sixth transistor TA2. These inhibition means are activated when the virtual terminal TVA is in the active state, i.e. when the sixth transistor TA2 is conducting. Indeed, when this sixth transistor TA2 is conducting it draws the full current JA, and consequently the signal COMA transmitted to the virtual terminal TVB has a zero value. Given the assumptions made above, the fifth and sixth transistors TA1 and TA2 remain blocked, and the virtual terminal TVA remains in the passive state. The sixth transistor TA2 does not draw the current JA, and this current JA is transmitted to the virtual terminal TVB. Said current JA renders the seventh and eighth transistors TB1 and TB2 conducting. In an advantageous embodiment of the invention, the dimensions of the eighth transistor TB2 are much greater than those of the seventh transistor TB1 such that the eighth transistor TB2 switches before the seventh transistor TB1 and becomes conducting before the seventh transistor TB1. This enables to ensure that the current JB which could arise is necessarily passed through the eighth transistor TB2. The seventh transistor TB1, which forms the control means CTRLB of the virtual terminal TVB, generates a current IB in the fourth transistor TB3, which becomes conducting, and sets the potential of the line B for zero. A current JB arises in the fifth transistor TB4. This current JB is the control signal COMB which the real terminal TRB is capable of sending to the virtual terminal TVA. The eighth transistor TB2, however, which in this embodiment of the invention belongs to the inhibition means for the virtual terminal TVB, is conducting and absorbs said current JB. The inhibition means of the virtual terminal TVB are activated and prevent the real terminal TRB from sending the control signal COMB to the virtual terminal TVA. As was noted above, a terminal receiving a data cannot transmit any control signal. Thus, in this embodiment the data is transmitted to the line B, and this line B cannot send data in its turn as long as the line A is transmitting. Indeed, the moment the line A stops transmitting, the line is once more set for the potential VDDA. The currents IA and JA become zero, and as a result the seventh and eighth transistors TB1 and TB2 become non-conducting. The potential of the line B is set for VDDB. The current JB is no longer passed through the eighth transistor TB2, which switches before the seventh transistor TB1, and the current JB, which may have appeared for a short moment, is accommodated in the fifth resistor RA up to the moment when it also becomes zero. The current IB becomes zero. The device then again is in the idle state with the real and virtual terminals in the passive state. The system has returned to its initial state, and the line B is immediately capable of transmitting a data in its turn, and of responding. The structure of the device 1 being symmetrical, a similar description is applicable to the transmission of a data from the line B to the line A, for which case the indices A and B are to be interchanged.

Another embodiment of a transmission device 1 according to the invention is shown in FIG. 3. As in the device shown in FIG. 2, a line transmitting a data is set for a zero potential and a line in the idle state is set for a potential VDD. In this embodiment, the transmission device 1 comprises real terminals TRA, TRB and virtual terminals TVA, TVB associated with each of the lines A and B. The real terminal TRA comprises a seventh resistor R5, a ninth transistor TA7, and a tenth transistor TA8. The seventh resistor R5 is connected between the line A and the reference potential terminal VDDA. The ninth and tenth transistors TA7, TA8 form an inverter {TA7, TA8} enabling the inversion of the potential of the line A, which is connected to an input of said inverter {TA7, TA8}. In a symmetrical arrangement, the real terminal TRB comprises an eighth resistor R6, an eleventh transistor TB7, and a twelfth transistor TB8. The eleventh and twelfth transistors TB7 and TB8 form an inverter {TB7, TB8} for inverting the potential of the line B, which is connected to an input of said inverter {TB7, TB8}. The virtual terminal TVA comprises a thirteenth transistor TA5, a fourteenth transistor TA6, and a ninth resistor R7. The thirteenth transistor TA5 is connected between the line A and the reference potential terminal GND. The fourteenth transistor TA6 is connected between a junction point QA, formed by an output of the inverter {TA7, TA8}, and the reference potential terminal GND. The thirteenth and fourteenth transistors TA5 and TA6 are interconnected by their respective control electrodes. The ninth resistor R7 is placed between the control electrodes of the thirteenth and fourteenth transistors TA5 and TA6 and the reference potential terminal GND.

The real terminal TRA is in an active state when the ninth transistor TA7 is conducting while the tenth transistor TA8 is blocked. The real terminal TRA is in a passive state when the ninth transistor TA7 is blocked while the tenth transistor TA8 is conducting. The virtual terminal TVA is in an active state when the thirteenth and fourteenth transistors TA5 and TA6 are conducting, and is in a passive state when the thirteenth and fourteenth transistors TA5 and TA6 are blocked. A similar description is applicable in symmetrical fashion for the real terminal TRB and the virtual terminal TVB associated with the line B.

It is assumed that initially none of the lines transmits a data. The lines A and B are in the idle state and are set for their respective potentials VDDA and VDDB. The ninth transistor TA7 is blocked, the tenth transistor TA8 is conducting, and the terminal TRA is in the passive state. Similarly, the ninth resistor R7 keeps the control electrodes of the thirteenth and fourteenth transistors TA5 and TA6 at the reference potential GND. The thirteenth and fourteenth transistors TA5 and TA6 are blocked, and the virtual terminal TVA is in the passive state. A similar description is applicable in symmetrical fashion to the real terminal TRB and the virtual terminal TVB associated with the line B. The real terminals TRA, TRB and the virtual terminals TVA, TVB are thus initially in the passive state.

Let us suppose that subsequently the line A transmits a data to the line B. The potential of the transmitting line A is set for zero, and this line A passes from the initial passive state to the active state. The junction point QA is then set for the potential VDDA corresponding to a logic level 1 of this junction point QA. The potential of the junction point QA is the control signal COMA transmitted by the real terminal TRA to the virtual terminal TVB associated with the line B. In this embodiment, the control means of the real terminal A are thus formed by the inverter {TA7, TA8}, and the control signal COMA, COMB appears in the form of a potential and not in the form of a current JA or JB, as in the embodiment shown in FIG. 1. The utilization of the control signals in this form is advantageous in that it ensures a faster switching of the terminals than does the utilization of current signals. Furthermore, the inhibition means INHA of the virtual terminal TVA are formed by the fourteenth transistor TA6. These inhibition means are activated when the virtual terminal TVA is in the active state, i.e. when the fourteenth transistor TA6 is conducting. Indeed, when the fourteenth transistor TA6 is conducting, it sets the potential of the junction point QA for zero. In that case the signal COMA cannot be transmitted to the virtual terminal TVB. Given the above assumptions, the fourteenth transistor TA6 remains blocked, and the virtual terminal TVA remains in the passive state. The junction point QA is accordingly at the logic level 1 and its potential renders the fifteenth and sixteenth transistors TB5 and TB6 conducting. The fifteenth transistor TB5, forming the control means for the virtual terminal TVB, sets the potential of the line B for zero when it has become conducting. In an advantageous embodiment of the invention, the characteristics of the eleventh and sixteenth transistors TB6 and TB7 are chosen such that only the sixteenth transistor TB6 controls the potential of a junction point formed by the output of the inverter {TB7, TB8}. The sixteenth transistor TB6, which forms part of the inhibition means INHB of the virtual terminal TVB, is conducting and sets the potential of the junction point QB for zero, thus inhibiting the control means of the real terminal TRB. Indeed, the inverter {TB7, TB8} of the real terminal TRB can no longer set the potential of the junction point QB for the logic level 1, since it is kept at the logic zero level by the sixteenth transistor TB6. The inverter {TB7, TB8}, which forms the control means for the real terminal TRB, can no longer transmit the control signal COMB. When the line A no longer transmits, its potential is again set for VDDA. The potential of the junction point QA returns to zero and, owing to the resistor RB connected to the reference potential terminal GND, the fifteenth and sixteenth transistors TB5 and TB6 become non-conducting. The virtual terminal TVB is again in the passive state, and its inhibition means INHB are deactivated. The transistor TB5 becoming cut off, the line B is again at the potential VDDB, and the potential of the junction point QB is set for zero. The terminals are again in the passive state, and the system has returned to its initial state, whereby the line B in its turn is immediately rendered capable of transmitting a data in response. Since the device 1 is symmetrical, a similar description is applicable to the transmission of a data from the line B to the line A, for which the indices A and B are to be interchanged. The transmission devices provided in accordance with the invention do not introduce any delay between the reception of a data by a line and the response which this same line is capable of sending to the transmitting line.

What is claimed is:

1. A data transmission device between two lines for the purpose of transmitting digital data whose logic levels correspond to an active state and an idle state of each line, by means of an interface module which provides the connection between said lines, characterized in that the interface module comprises a real terminal and a virtual terminal associated with each of the lines, wherein each real terminal is provided with means for reproducing the state of the line with which it is associated and conversely controlling the state of the line, and is provided with control means for controlling the state of the virtual terminal associated with the other line, and each virtual terminal is provided with means for enabling it to enter an active state when the line with which it is not associated must transmit a data and to enter a passive state if this is not the case, with means for controlling the state of the real terminal with which it is associated, and with means for inhibiting the operation of the control means of said real terminal if and exclusively if the virtual terminal is in the active state.

2. A data transmission device as claimed in claim 1, characterized in that the control means of a real terminal associated with a line are designed for generating a control signal, the virtual terminal associated with the other line being in the active state when the value of said control signal is higher than or equal to a given value, and is in the passive state if this is not the case.

3. A data transmission device as claimed in claim 2, characterized in that the inhibition means of a virtual terminal inhibit the operation of the control means of the associated real terminal by modifying the value of the control signal.

4. A data transmission device as claimed in claim 2, characterized in that each virtual terminal associated with a line comprises a transistor which, when driven into conduction, enables said virtual terminal to inhibit the operation of the control means of the associated real terminal, said transistor being designed for receiving the control signal from the real terminal associated with the other line.

5. A data transmission method between two lines able to transmit digital data, whose logic levels correspond to an active state and an idle state of said lines by means of an interface module which provides the connection between the lines and which comprises a real terminal and a virtual terminal associated with each of the lines, which method comprises the following steps for the transmission of a data from a transmitting line to a receiving line:

reproduction by the real terminal associated with the transmitting line of the state of said line, making the virtual terminal associated with the receiving line enter the active state, controlling of the real terminal associated with the receiving line by the associated virtual terminal, transmission of the data over the receiving line by the real terminal associated with this line.

* * * * *